United States Patent
Lin et al.

(10) Patent No.: US 11,209,545 B2
(45) Date of Patent: Dec. 28, 2021

(54) AUXILIARY POSITIONING SYSTEM WITH REFLECTIVE STICKERS

(71) Applicant: TECO Electric & Machinery Co., Ltd., Taipei (TW)

(72) Inventors: Chia-Jen Lin, Taipei (TW); Cheng-Yun Chung, Taipei (TW); Shih-Chang Cheu, Taipei (TW); Chun Chi Lai, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 391 days.

(21) Appl. No.: 16/521,405

(22) Filed: Jul. 24, 2019

(65) Prior Publication Data

US 2021/0003709 A1    Jan. 7, 2021

(30) Foreign Application Priority Data

Jul. 1, 2019 (TW) ................................ 108123035

(51) Int. Cl.
*G01S 17/00* (2020.01)
*G01S 17/74* (2006.01)
*G01S 7/48* (2006.01)

(52) U.S. Cl.
CPC ............ *G01S 17/74* (2013.01); *G01S 7/4808* (2013.01)

(58) Field of Classification Search
USPC ..................................................... 356/4.07
See application file for complete search history.

(56) References Cited

U.S. PATENT DOCUMENTS

| 10,060,724 | B2* | 8/2018 | Held | G06K 9/00201 |
|---|---|---|---|---|
| 10,731,966 | B2* | 8/2020 | Pasquale | B60M 1/28 |
| 10,739,439 | B2* | 8/2020 | Wu | G01S 17/42 |
| 2010/0149073 | A1* | 6/2010 | Chaum | G02B 27/0172 345/8 |
| 2011/0142138 | A1* | 6/2011 | Tian | H04N 19/61 375/240.24 |
| 2012/0105821 | A1* | 5/2012 | Moser | G01S 17/66 356/3.09 |
| 2014/0307264 | A1* | 10/2014 | Luthi | G01B 5/004 356/498 |
| 2014/0372028 | A1* | 12/2014 | Wang | G05D 1/024 701/514 |
| 2014/0373369 | A1* | 12/2014 | Bockem | G01S 17/06 33/228 |

(Continued)

*Primary Examiner* — James R Hulka
(74) *Attorney, Agent, or Firm* — Muncy, Geissler, Olds & Lowe, P.C.

(57) ABSTRACT

An auxiliary positioning system includes a mobile platform and a plurality of reflective stickers. The reflective stickers are disposed in a navigation space. The mobile platform includes a map-establishing module, a positioning module, a laser scan and analysis module, a coordinate-processing module, a comparison module and a calibration module. The map-establishing module is utilized to generate a global map. The positioning module is utilized to locate a position coordinate. The laser scan and analysis module is utilized to scan the navigating space to generate a scan direction and distance vector. The coordinate-processing module is utilized to generate a position direction and distance vector. The comparison module is utilized to compare the scanning coordinate with the mapping coordinate. The calibration module is utilized to calibrate the position coordinate.

8 Claims, 10 Drawing Sheets

(56) References Cited

U.S. PATENT DOCUMENTS

| | | | |
|---|---|---|---|
| 2015/0009493 A1* | 1/2015 | Kwiatkowski | G01S 17/42 356/139.06 |
| 2015/0363936 A1* | 12/2015 | Hallett | G06T 7/521 382/106 |
| 2016/0252619 A1* | 9/2016 | Markendorf | G01S 17/66 356/3.01 |
| 2017/0143429 A1* | 5/2017 | Richmond | A61B 5/064 |
| 2018/0080755 A1* | 3/2018 | Held | G01B 11/0608 |
| 2018/0180733 A1* | 6/2018 | Smits | G06T 7/70 |
| 2018/0180740 A1* | 6/2018 | Shaffer | G05D 1/0236 |
| 2019/0126777 A1* | 5/2019 | Pasquale | B60L 5/26 |
| 2019/0265721 A1* | 8/2019 | Troy | G01C 21/005 |
| 2019/0302764 A1* | 10/2019 | Smith | B60R 1/003 |
| 2019/0339363 A1* | 11/2019 | Wu | G01S 7/4817 |

* cited by examiner

AUXILIARY POSITIONING SYSTEM WITH REFLECTIVE STICKERS

This application claims the benefit of Taiwan Patent Application Serial No. 108123035, filed Jul. 1, 2019, the subject matter of which is incorporated herein by reference.

BACKGROUND OF THE INVENTION

(1) Field of the Invention

The invention relates to a positioning system, and more particularly to the auxiliary positioning system with at least one reflective sticker.

(2) Description of the Prior Art

With technology progresses day by day, robots have been widely applied to various fields, including transportation, services, dining and so on. In the robot industry, positioning is one of many critical technology for robotic applications.

Generally speaking, to position a robot requires an algorithm called as on-line spatial state estimation, in which a position of the robot within a global coordinate system is estimated. However, while the robot moves in a navigation space with respect to the global coordinate system, accuracy of robot positioning would be influenced by changes of environmental appearances and mileage errors accumulated along the journey within the navigation space. As the position of the robot is biased, information for navigating or guiding the robot would be incorrect, moving of the robot would be deviated from a correct path, and thus false judgment at obstacles would occur. Thereupon, the robot would be hard to follow preset instructions, and might be damaged. Even that applications of the robots become more and more popular, yet the cost and the maintenance fee are still kept high.

SUMMARY OF THE INVENTION

Accordingly, in view of the positioning problem to the robot industry in the prior art, it is an object of the present invention to provide an auxiliary positioning system with reflective stickers that can upgrade the positioning of the robot so as to resolve the conventional positioning problem.

In the present invention, the auxiliary positioning system with reflective stickers includes a plurality of reflective stickers and a mobile platform. The reflective stickers are disposed in a navigation space. The mobile platform includes a map-establishing module, a positioning module, a laser scan and analysis module, a coordinate-processing module, a comparison module and a calibration module.

The map-establishing module, used for establishing a global map with respect to the navigation space, has each of the plurality of reflective stickers to have at least one first reflective area and at least one second reflective area according to an arrangement coding corresponding to a sticker coordinate of the each of the plurality of reflective stickers. The positioning module, electrically coupled with the map-establishing module, is used for providing a position coordinate on the global map.

The laser scan and analysis module is used for generating a laser beam, scanning the navigation space, receiving a reflective signal in the navigation space, and realizing a signal intensity corresponding to the reflective signal. While in scanning a background region in the navigation space, the signal intensity is defined as a background reflection intensity. While in scanning one of the plurality of reflective stickers in the navigation space, the signal intensity is defined as a sticker reflection intensity larger than the background reflection intensity. When the signal intensity is the sticker reflection intensity, a scan direction and distance vector of the each of the plurality of respective reflective stickers with respect to the mobile platform is further captured, and the arrangement coding corresponding to the each of the plurality of reflective stickers is analyzed simultaneously from the reflective signal.

The coordinate-processing module, electrically coupled with the laser scan and analysis module, is used for receiving the arrangement coding and further for transforming the arrangement coding into the sticker coordinate for the each of the plurality of reflective stickers, in which the sticker coordinate and the position coordinate are used to form a corresponding position direction and distance vector. The comparison module, electrically coupled with the coordinate-processing module and the laser scan and analysis module, is used for receiving and comparing the scan direction and distance vector and the position direction and distance vector to generate a corresponding calibration signal. The calibration module, electrically coupled with the comparison module and the map-establishing module, is used for receiving the calibration signal and further for calibrating the position coordinate on the global map according to the calibration signal.

In one embodiment of the present invention, the each of the plurality of reflective stickers includes a main layer and at least one shading strip. The main layer has a reflective surface. The shading strip covers a portion of the reflective surface to form a second reflective area, while another portion of the reflective surface uncovered by the shading strip forms a first reflective area.

In one embodiment of the present invention, the each of the plurality of reflective stickers is disposed at a fixed object in the navigation space.

In one embodiment of the present invention, the positioning module includes a mileage-calculating unit, a direction-detecting unit and a positioning unit. The mileage-calculating unit is used for calculating a mileage of the mobile platform. The direction-detecting unit is used for detecting a moving direction of the mobile platform. The positioning unit, electrically coupled with the mileage-calculating unit and the direction-detecting unit, uses the mileage and the moving direction to calculate the position coordinate.

In one embodiment of the present invention, the laser scan and analysis module includes a laser-emitting unit, a receiving unit, a judging unit and an analyzing unit. The laser-emitting unit is used for emitting the laser beam. The receiving unit is used for receiving the reflective signal. The judging unit is used for determining whether or not the signal intensity of the reflective signal is the sticker reflection intensity. The analyzing unit is used for capturing the scan direction and distance vector and further for analyzing the reflective signal to realize the arrangement coding upon when the judging unit determines that the signal intensity is the sticker reflection intensity.

In one embodiment of the present invention, the coordinate-processing module includes a coordinate-calculating unit for calculating a difference between the sticker coordinate and the position coordinate to form the position direction and distance vector.

In one embodiment of the present invention, the comparison module includes a judging and comparing unit for calculating a difference between the scan direction and distance vector and the position direction and distance vector to generate the calibration signal.

In one embodiment of the present invention, the sticker reflection intensity is larger than the background reflection intensity at least by five times.

As stated, the auxiliary positioning system with reflective stickers provided by the present invention utilizes the reflective stickers and the mobile platform. While the scan direction and distance vector and the position direction and distance vector are different, the position coordinate on the global map is calibrated so as to have the position of the mobile platform in the navigation space to match the position coordinate on the global map.

All these objects are achieved by the auxiliary positioning system with reflective stickers described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a auxiliary positioning system with reflective stickers. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
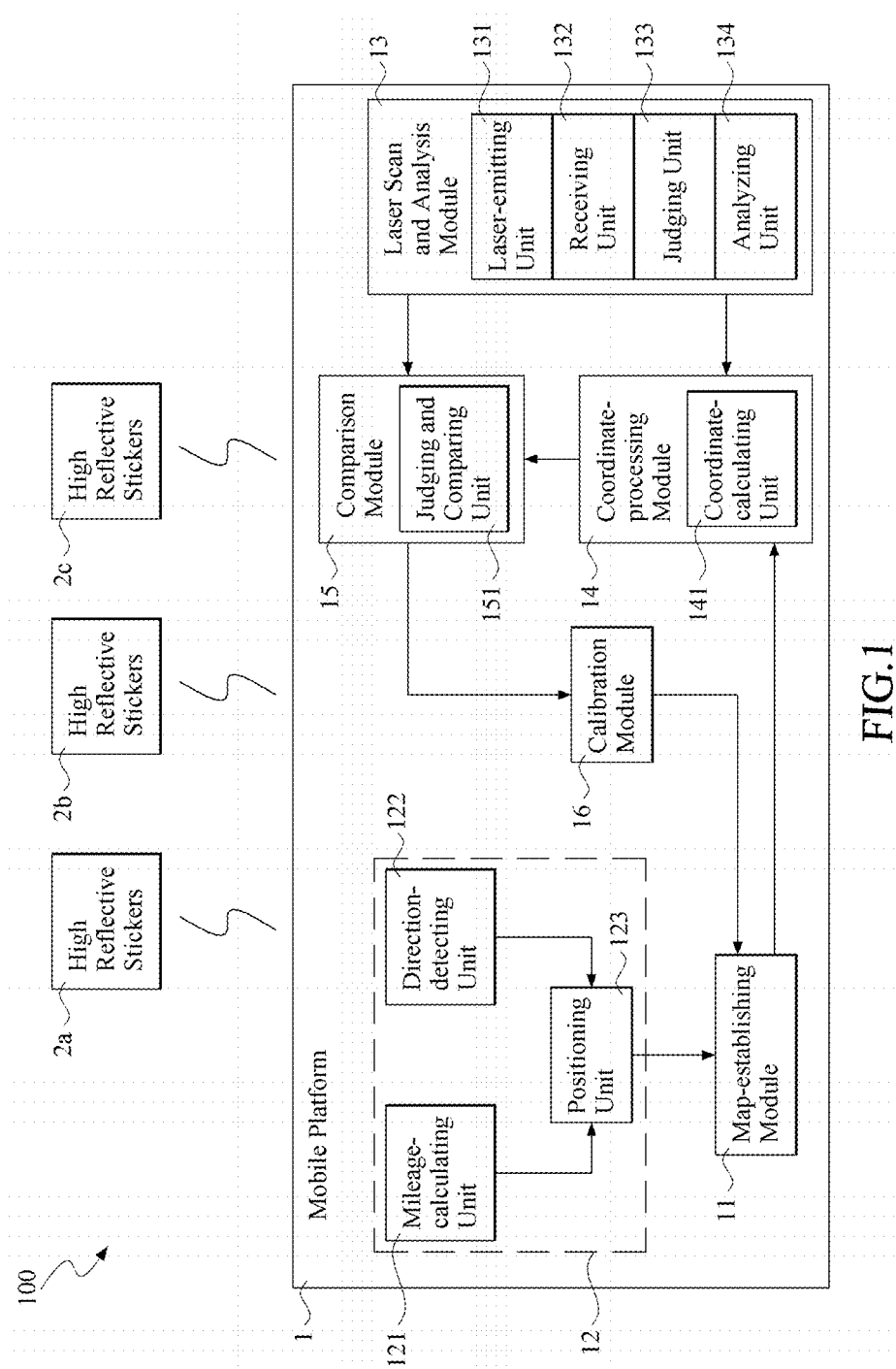
FIG. 1 is a schematic block view of a preferred embodiment of the auxiliary positioning system with reflective stickers in accordance with the present invention.
Figure 2:
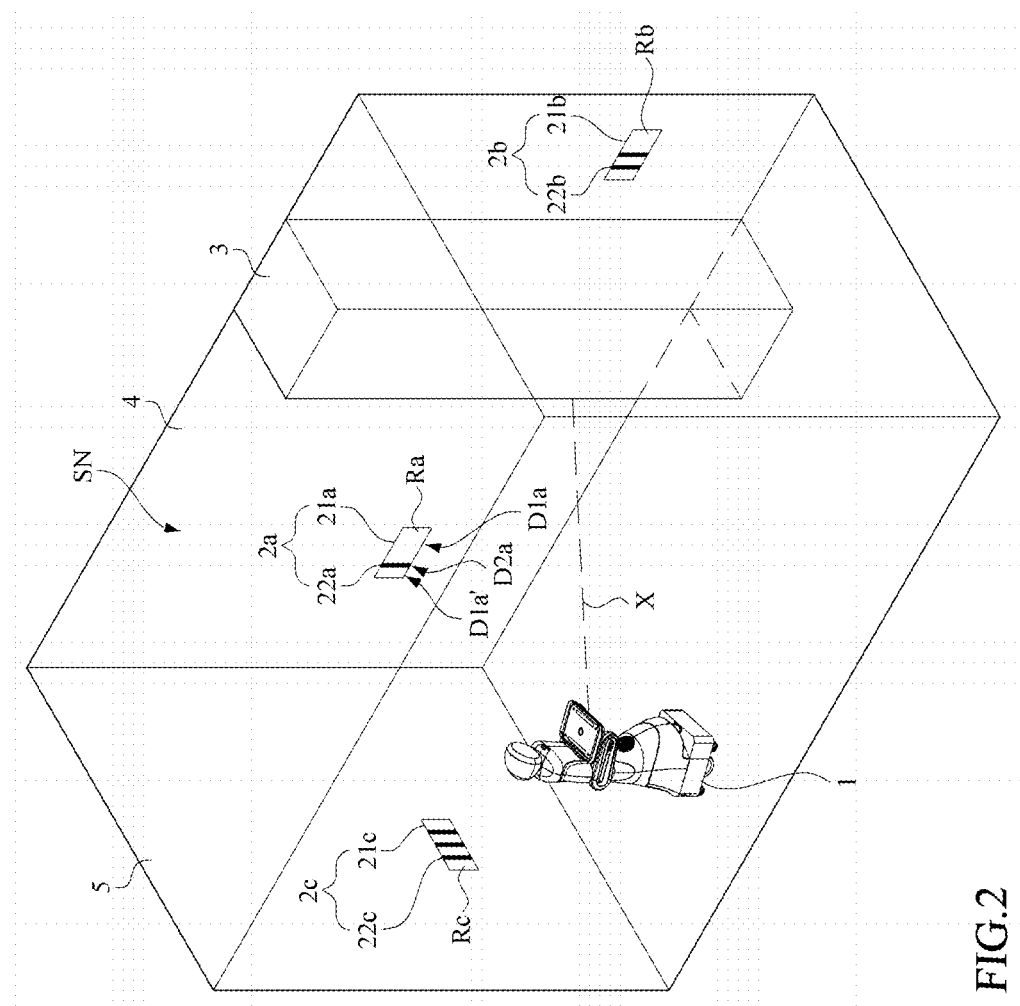
FIG. 2 is a schematic 3D view of the preferred embodiment of the auxiliary positioning system with reflective stickers in a navigation space in accordance with the present invention.
Figure 3:
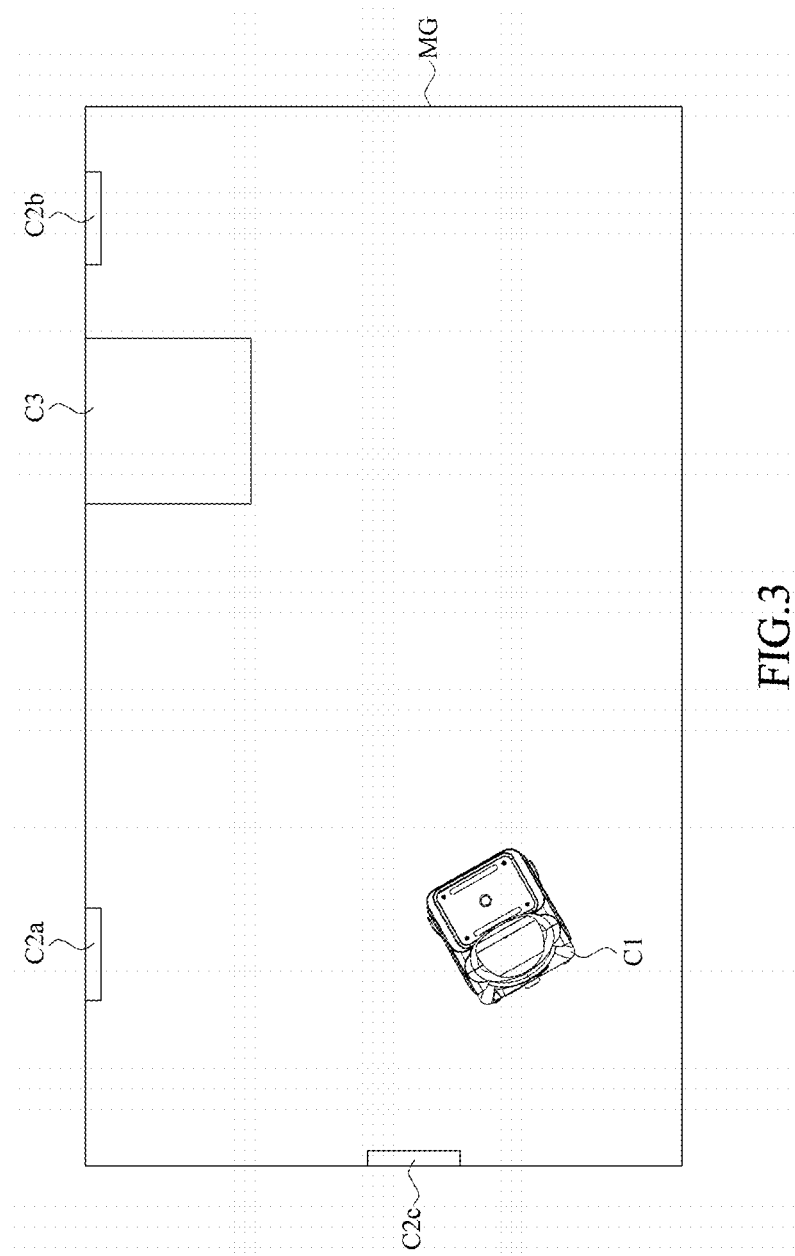
FIG. 3 is a schematic top view of FIG. 2 (a global map)

Refer now to FIG. 1 through FIG. 3; where FIG. 1 is a schematic block view of a preferred embodiment of the auxiliary positioning system with reflective stickers in accordance with the present invention, FIG. 2 is a schematic 3D view of the preferred embodiment of the auxiliary positioning system with reflective stickers in a navigation space in accordance with the present invention, and FIG. 3 is a schematic top view of FIG. 2 (a global map). As shown, the auxiliary positioning system with reflective stickers 100 includes a plurality of reflective stickers (labeled as 2a, 2b, 2c in the figure) and a mobile platform 1.

The reflective stickers 2a, 2b, 2c are disposed at fixed objects 3, 4, 5 in a navigation space SN, in which any of the fixed objects 3, 4, 5 is an object fixedly disposed in the navigation space SN, such as a wall, a floor, a column and a roof. In this embodiment, the reflective stickers 2a, 2b are disposed on the fixed object 4, while the reflective sticker 2c is disposed on the fixed object 5.

Each of the reflective stickers 2a, 2b, 2c has a main layer and at least one shading strip. The main layer has a reflective surface, and the shading strip is disposed on the reflective surface. The shading strip is overlapping a second reflective area of the reflective surface, while the reflective surface uncovered by the shading strip is defined as a first reflective area. By having the reflective sticker 2a as an example, the reflective sticker 2a has a main layer 21a and a shading strip 22a. The main layer 21a has a reflective surface Ra, and the shading strip 22a is disposed on the reflective surface Ra to cover a second reflective area D2a of the reflective surface Ra. In the reflective surface Ra, the portion thereof that is not covered by the shading strip 22a is defined to be the first reflective areas D1a, D1a'.

Similarly, the reflective sticker 2b includes two shading strips 22b, and thus two second reflective areas. The portion of the reflective surface Rb of the main layer 21b that is not covered by the shading strips 22b is appeared to form three separate first reflective areas. In addition, the reflective sticker 2C includes three shading strips 22c, i.e., three second reflective areas, while the portion of the reflective surface Rc of the main layer 21c that is not covered by the shading strips 22c would form four separate first reflective areas.

The mobile platform 1 includes a map-establishing module 11, a positioning module 12, a laser scan and analysis module 13, a coordinate-processing module 14, a comparison module 15 and a calibration module 16.

The map-establishing module 11 would evaluate the navigation space SN to create a global map MG, so that the reflective stickers 2a, 2b, 2c in the navigation space SN can have corresponding sticker coordinates C2a, C2b, C2c, and the fixed object 3 can also have a corresponding object coordinate C3. For a concise description, objects on the global map MG are represented simply by corresponding coordinates as listed above.

The positioning module 12, electrically coupled with the map-establishing module 11, is used to position the mobile platform 1 on the global map MG by a position coordinate C1. The positioning module 12 includes a mileage-calculating unit 121, a direction-detecting unit 122 and a positioning unit 123. The mileage-calculating unit 121 is used to calculate a mileage of the mobile platform 1. The direction-detecting unit 122 is used to detect a moving direction of the mobile platform 1. The positioning unit 123, electrically coupled with the mileage-calculating unit 121 and the direction-detecting unit 122, uses the mileage and the moving direction to calculate a corresponding position coordinate C1.

The laser scan and analysis module 13 is used for generating a laser beam, scanning the navigation space SN, and receiving reflective signals in the navigation space SN. Since the fixed objects 3, 4, 5 and the reflective stickers 2a, 2b, 2c are located in the navigation space SN, thus the reflective signals can be further separated into reflective sticker signals for the corresponding reflective stickers 2a, 2b, 2c and reflective background signals for the corresponding background objects. The background objects stand for the objects in the navigation space SN other than the reflective stickers 2a, 2b, 2c, such as the fixed objects 3, 4, 5. After the laser scan and analysis module 13 receives the reflective signals, corresponding signal intensities for individual reflective signals would be realized.

While a background region (existing the background objects) in the navigation space SN is scanned, the resulted signal intensity is defined as a background reflection intensity, While the reflective stickers 2a, 2b, 2c in the navigation space SN is scanned, the resulted signal intensity is defined as a sticker reflection intensity, which is usually larger than the background reflection intensity. When the signal intensity is the sticker reflection intensity, a scan direction and distance vector of the respective reflective sticker with respect to the mobile platform 1 can be further captured, and corresponding arrangement coding for this reflective sticker can be analyzed simultaneously from the reflective signal. Preferably, the sticker reflection intensity is larger than the respective background reflection intensity at least by five times.

In the present invention, the arrangement coding can be treated as an identification code for the respective reflective sticker. Thus, each of the reflective stickers would be mapped by specific arrangement coding, and arrangement coding for different reflective stickers would be different. As shown, the arrangement coding for the reflective sticker 2a is "white, black, white", the arrangement coding for the reflective sticker 2b is "white, black, white, black, white", and the arrangement coding for the reflective sticker 2c is "white, black, white, black, white, black, white". Apparently, the "white" stands for each first reflective area on the main layers 21a, 21b, 21c, and the "black" stands for each second reflective area covered by respective shading strip 22a, 22b or 22c. In this embodiment, each of the shading strips 22a, 22b, 22c can be a black cloth, a black tape or any strip structure that can block the light.

In this embodiment, the laser scan and analysis module 13 includes a laser-emitting unit 131, a receiving unit 132, a judging unit 133 and an analyzing unit 134. Preferably, the laser scan and analysis module 13 can be an optical sensor such as a LiDAR (light detection and ranging) sensor or radar.

The coordinate-processing module 14, electrically coupled with the laser scan and analysis module 13, is used for receiving arrangement coding, and further for transforming the arrangement coding into corresponding sticker coordinates for respective reflective stickers. The coordinate-processing module 14 would then calculate the sticker coordinates and the position coordinate C1 so as to obtain a corresponding position direction and distance vector. In this embodiment, the coordinate-processing module 14 includes a coordinate-calculating unit 141.

The comparison module 15, electrically coupled with the coordinate-processing module 14 and the laser scan and analysis module 13, is used for receiving and comparing the scan direction and distance vector and the position direction and distance vector, such that a corresponding calibration signal can be generated. In this embodiment, the comparison module 15 includes a judging and comparing unit 151.

The calibration module 16, electrically coupled with the comparison module 15 and the map-establishing module 11, is used for receiving the calibration signal, and further for calibrating the position coordinate C1 on the global map MG according to the calibration signal.

Figure 4:
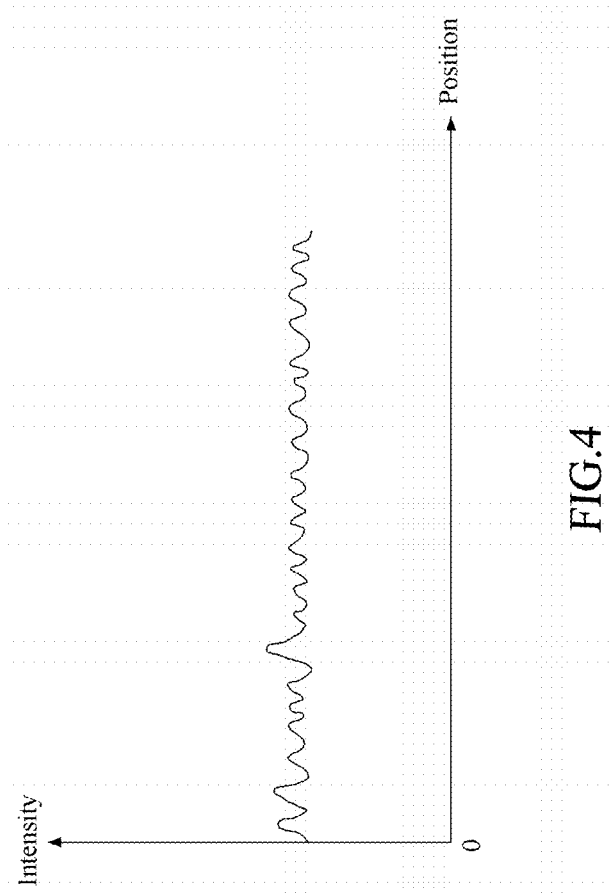
FIG. 4 is a schematic plot of intensity of the reflective background signal of the auxiliary positioning system with reflective stickers of FIG. 2.
Figure 5:
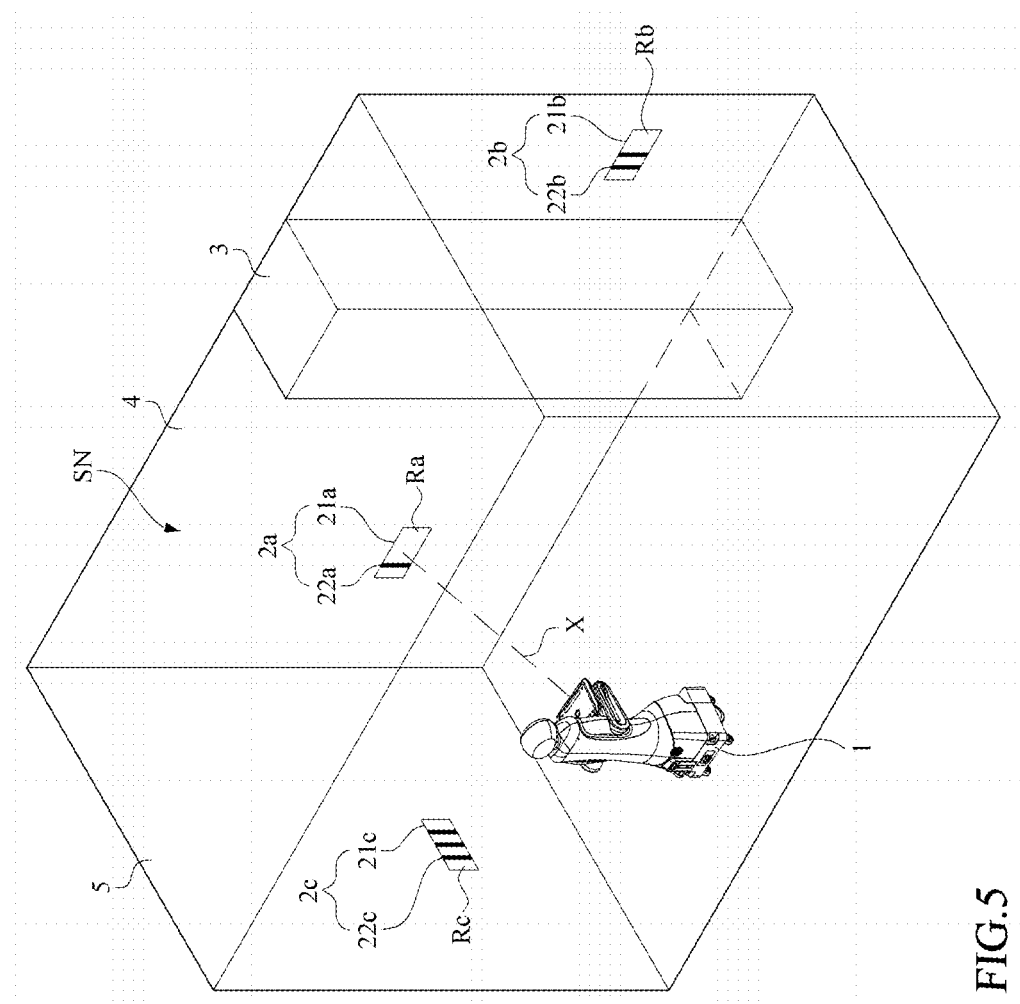
FIG. 5 is another schematic 3D view of the preferred embodiment of the auxiliary positioning system with reflective stickers in the navigation space in accordance with the present invention.
Figure 6:
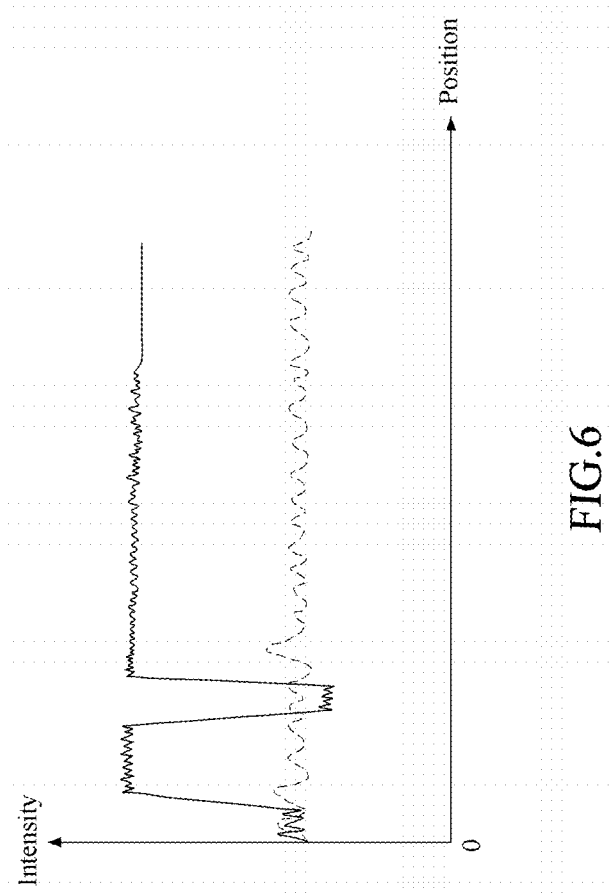
FIG. 6 is a schematic plot of intensity of the reflective sticker signal of the auxiliary positioning system with reflective stickers of FIG. 5.

Then, refer also to FIG. 4 through FIG. 6 with FIG. 1 to FIG. 3; where FIG. 4 is a schematic plot of intensity of the reflective background signal of the auxiliary positioning system with reflective stickers of FIG. 2, FIG. 5 is another schematic 3D view of the preferred embodiment of the auxiliary positioning system with reflective stickers in the navigation space in accordance with the present invention, and FIG. 6 is a schematic plot of intensity of the reflective sticker signal of the auxiliary positioning system with reflective stickers of FIG. 5.

When the mobile platform 1 faces right on the fixed object 3 (as shown in FIG. 2), the laser-emitting unit 131 would emit a laser beam, and then reflective signals associated with signal intensities shown in FIG. 4 would be received by the receiving unit 132. Further, when the mobile platform 1 faces right on the reflective sticker 2a (as shown in FIG. 5), the laser-emitting unit 131 would emit another laser beam, and then reflective signals associated with signal intensities shown in FIG. 6 would be received by the receiving unit 132. In either FIG. 2 or FIG. 5, an auxiliary line X stands for an instant facing direction of the mobile platform 1, so that the object faced by the mobile platform 1 can be concisely targeted.

Referring also to FIG. 4 and FIG. 6, the judging unit 133 would be introduced to realize the signal intensities of the corresponding reflective signals; i.e., to determine whether or not the signal intensities of the reflective signals are the sticker reflection intensities. As the reflective signals are sent back by the fixed object 3, the resulted signal intensities would be the background reflection intensities. On the other hand, as the reflective signals are sent back by the reflective sticker 2a, the resulted signal intensities would be the sticker reflection intensities, generally larger than the background reflection intensities. In FIG. 6, dashed lines stand for the background reflection intensities, and solid lines stand for the corresponding sticker reflection intensities. In the case that at least one area of the signal intensities demonstrates a local maximum, the corresponding reflective signals would be judged to be the reflective sticker signals sent back from the respective reflective stickers. In the case that the signal intensities demonstrate only slight fluctuations, the respective reflective signals would be judged to the reflective background signals, for example, sent back by the fixed object 3 as shown in FIG. 4. If the judging unit 133 determines that the signal intensities of the reflective signals are attributed to be the sticker reflection intensities, the analyzing unit 134 would be introduced to further analyze the reflective signals.

Referring to FIG. 5 and FIG. 6, on studying the signal intensities, two local maximum areas are obvious, and a local minimum area is sandwiched by these two local maximum areas. In this embodiment, since the reflective surface has higher reflectivity to magnify the signal intensities of the reflective signals received by the receiving unit 132, it is read that each of the local maximum areas are mapped to an uncovered reflective surface on the main layer (for example, the reflective surface Ra on the main layer 21a). On the other hand, the local minimum area is mapped to one shading strip (for example, the shading strip 22a), since the shading strip can block and receive part of the laser beam so as to reduce the signal intensities of the reflective signals received by the receiving unit 132. Thereupon, the analyzing unit 134 can judge that the arrangement coding for the reflective signals expressed by FIG. 6 is "white, black, white", which is then mapped to the reflective sticker 2a with the arrangement coding of "white, black, white".

Then, according to the sticker reflection intensities of the reflective signals, the analyzing unit 134 can further determine the scan direction and distance vector of the mobile platform 1 with respect to the reflective sticker 2a. Since the scan direction and distance vector is obtained through corresponding scan and analysis by the laser scan and analysis module 13, thus the scan direction and distance vector can be treated as a practical relative position relationship between the reflective sticker 2a and the mobile platform 1.

Figure 7:
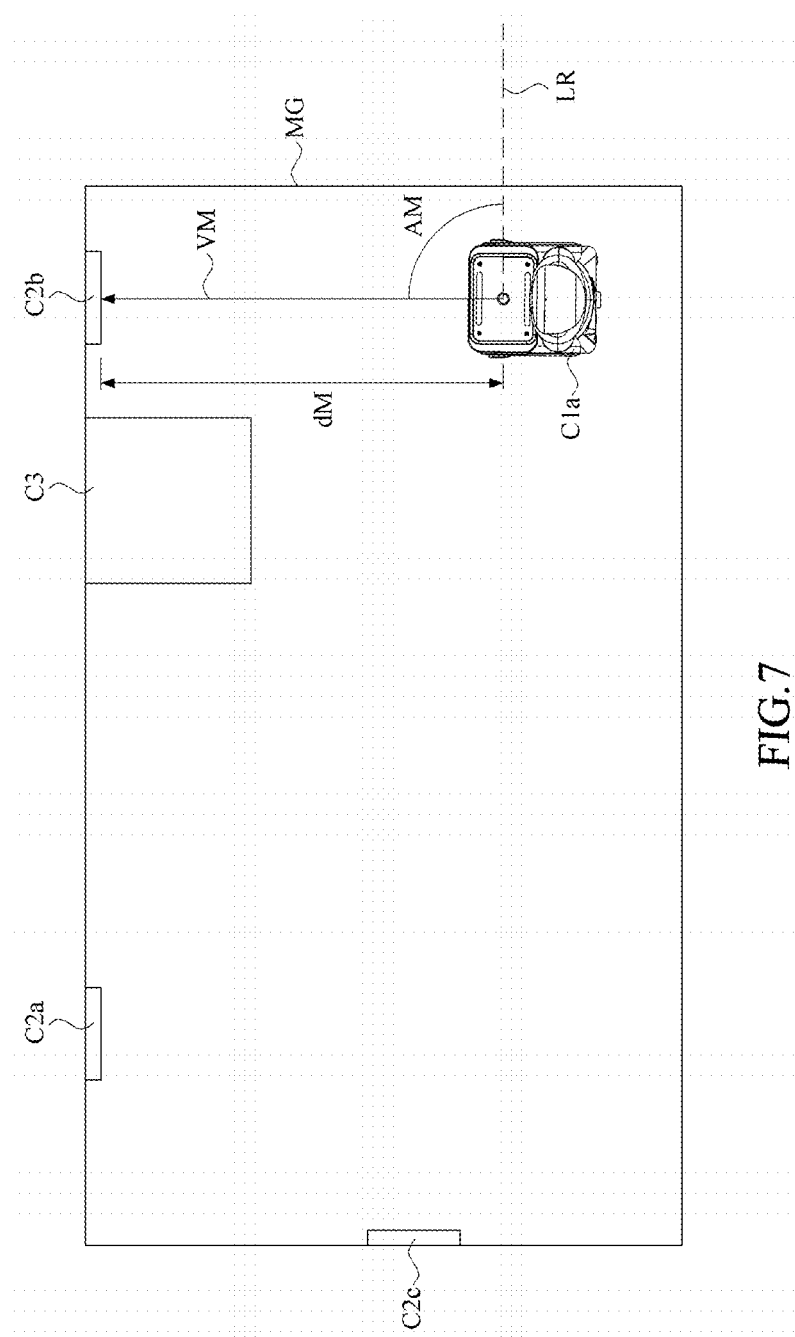
FIG. 7 is another schematic top view of the preferred embodiment of the auxiliary positioning system with reflective stickers in the navigation space in accordance with the present invention (a global map)
Figure 8:
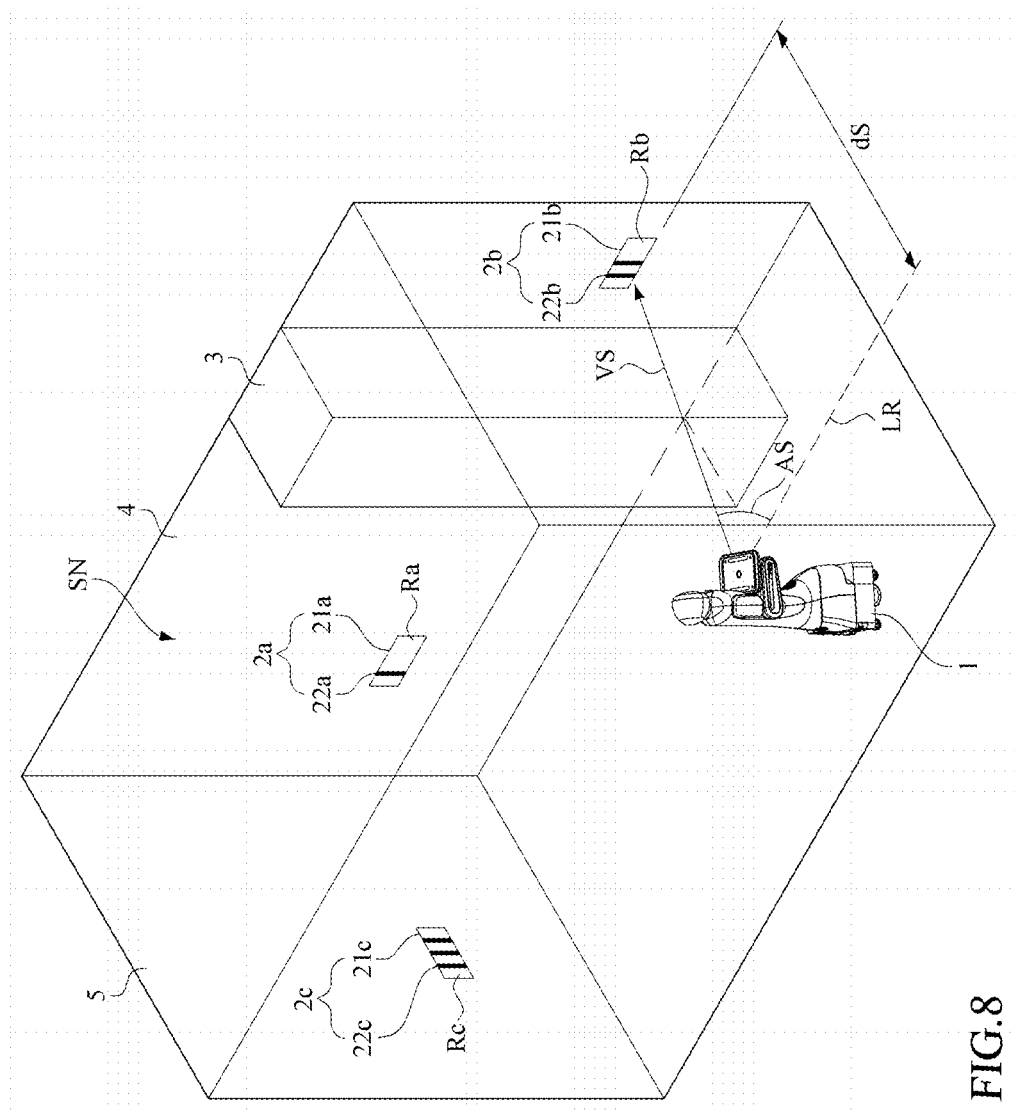
FIG. 8 is a further schematic 3D view of the preferred embodiment of the auxiliary positioning system with reflective stickers in the navigation space in accordance with the present invention.
Figure 9:
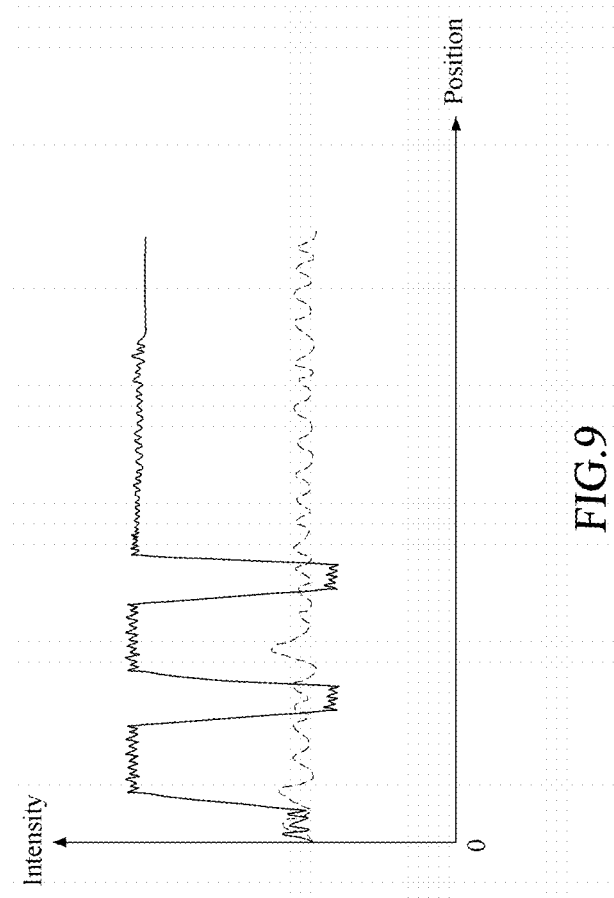
FIG. 9 is a schematic plot of intensity of the reflective sticker signal of the auxiliary positioning system with reflective stickers of FIG. 8.
Figure 10:
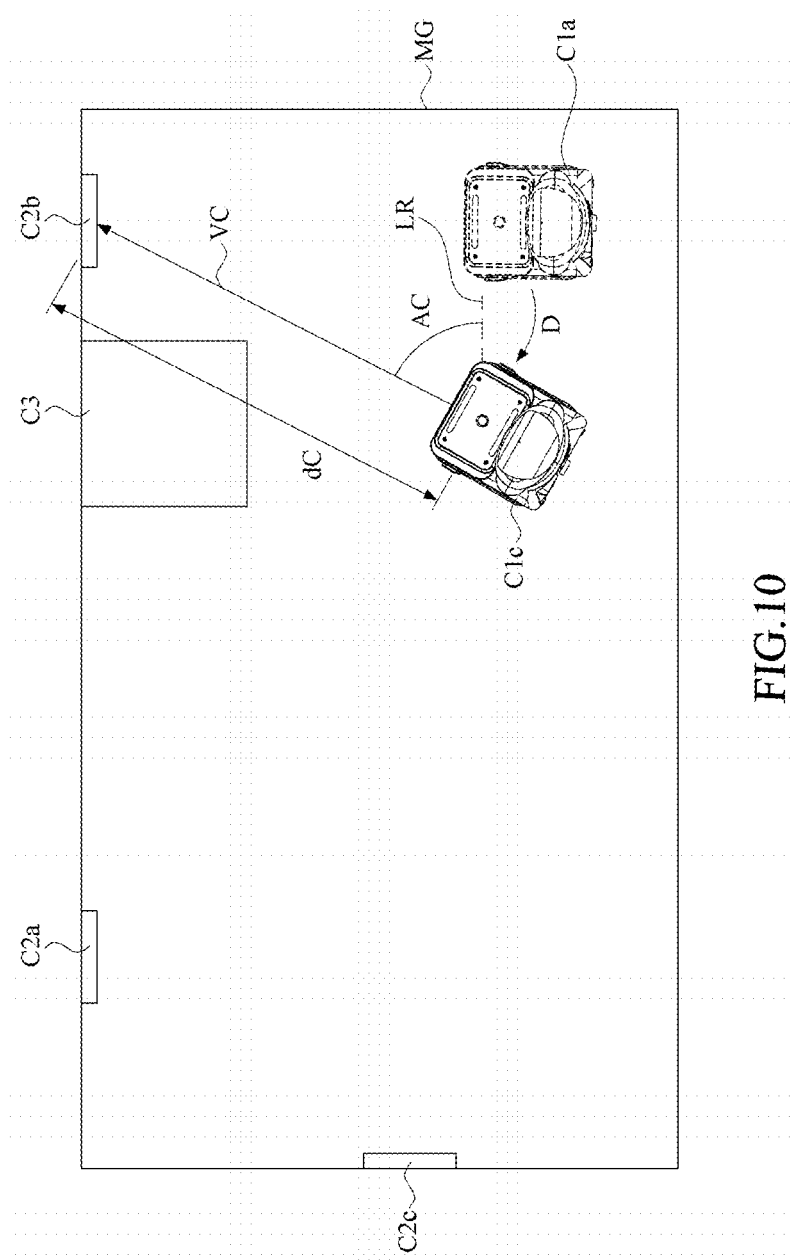
FIG. 10 is schematically a calibrated global map for the auxiliary positioning system with reflective stickers in accordance with the present invention.

Finally, refer now to FIG. 7 through FIG. 10 with FIG. 1; where FIG. 7 is another schematic top view of the preferred embodiment of the auxiliary positioning system with reflective stickers in the navigation space in accordance with the present invention (a global map), FIG. 8 is a further schematic 3D view of the preferred embodiment of the auxiliary positioning system with reflective stickers in the navigation space in accordance with the present invention, FIG. 9 is a schematic plot of intensity of the reflective sticker signal of the auxiliary positioning system with reflective stickers of FIG. 8, and FIG. 10 is schematically a calibrated global map for the auxiliary positioning system with reflective stickers in accordance with the present invention.

As shown in FIG. 7, the global map MG illustrates that the position coordinate C1a is located right under the sticker coordinate C2b (in the illustration of the figure). Namely, in the navigation space SN, the mobile platform 1 is positioned right in front of the reflective sticker 2b. It shall be explained that the sticker coordinate C2b is obtained by transforming the arrangement coding realized by the coordinate-processing module 14 and the laser scan and analysis module 13. Also, the sticker coordinate C2b and the position coordinate C1a form a position direction and distance vector VM that includes a map bearing angle (or azimuth angle) AM and a map distance dM. The map bearing angle AM is an angle formed between a reference line LR and the position direction and distance vector VM. Namely, the map bearing angle AM is the rotation angle for the mobile platform 1 to rotate from a state facing the reference line LR to another state facing the sticker coordinate C2b.

As shown in FIG. 8 and FIG. 9, in the navigation space SN, the laser scan and analysis module 13 analyzes the arrangement coding from the corresponding reflective sticker signals, and realizes that the reflective sticker signals are reflected by the reflective sticker 2b. Further, a scan direction and distance vector VS from the mobile platform 1 to the reflective stickers 2b can be obtained, in which the scan direction and distance vector VS includes a scan bearing angle AS and a scan distance dS. In this embodiment, the scan bearing angle AS is the rotation angle for the mobile platform 1 to rotate from a state facing the reference line LR to another state facing the reflective sticker 2b.

At the same time, the comparison module 15 receives and compares the position direction and distance vector VM and the scan direction and distance vector VS. In this embodiment, the judging and comparing unit 151 of the comparison module 15 calculates differences between the position direction and distance vector VM and the scan direction and distance vector VS so that a comparison between the scan direction and distance vector VS and the position direction and distance vector VM can be made. In other words, the judging and comparing unit 151 calculates the difference between the scan bearing angle AS and the map bearing angle AM, and also the difference between the scan distance dS and the map distance dM. In the case that any of the above differences is not zero, it implies that the position direction and distance vector VM is not identical to the scan direction and distance vector VS. Thus, relevant calibration is required. Practically, these differences may be caused by environmental changes, or an accumulated mileage error of the mobile platform 1.

As shown, in this embodiment, the scan bearing angle AS is different to the map bearing angle AM, and the scan distance dS is not identical to the map distance dM. Thus, at this moment, the mobile platform 1 in the navigation space SN is not mapped in position to the position coordinate C1a on the global map MG. According to the position coordinate C1a and the sticker coordinate C2b on the global map MG, the mobile platform 1 is guided to approach the reflective sticker 2b, and thus the mobile platform 1 in the navigation space SN would be highly possible to be led to hit the fixed object 3.

When the comparison module 15 determines that at least one difference between the scan direction and distance vector VS and the position direction and distance vector does exist, then a calibration signal can be generated accordingly. The calibration module 16, electrically coupled with the comparison module 15, receives the calibration signal, and uses the calibration signal to calibrate the position coordinate on the global map MG so as to adjust the position coordinate C1a into another position coordinate C1c in a calibration direction D.

Accordingly, a position direction and distance vector VC is formed from the position coordinate C1c toward the sticker coordinate C2b, where the position direction and distance vector VC includes a map bearing angle AC and a map distance dC. In this embodiment, the map bearing angle AC is equal to the scan bearing angle AS, and the map distance dC is also equal to the scan distance dS. Thereupon, the calibration module 16 can complete the calibration so as to have the position coordinate C1c on the global map MG to relevantly map the position of the mobile platform 1 in the navigation space SN.

In addition, the mobile platform 1 can also utilize simultaneously multiple reflective stickers for positioning, such that the position accuracy can be further increased.

In summary, the auxiliary positioning system with reflective stickers provided by the present invention utilizes the reflective stickers and the mobile platform. While the scan direction and distance vector and the position direction and distance vector are different, the position coordinate on the global map is calibrated so as to have the position of the mobile platform in the navigation space to match the position coordinate on the global map. Thereupon, the conventional problems caused by position errors as stated in the foregoing background section can be substantially resolved.

In addition, in the auxiliary positioning system with reflective stickers provided by the present invention, the mobile platform can utilize simultaneously a plurality of reflective stickers for positioning, such that accuracy in determining the position coordinate can be further ensured.

While the present invention has been particularly shown and described with reference to a preferred embodiment, it will be understood by those skilled in the art that various changes in form and detail may be without departing from the spirit and scope of the present invention.

What is claimed is:

1. An auxiliary positioning system with reflective stickers, comprising:

a plurality of reflective stickers, disposed in a navigation space; and a mobile platform, including:
   a map-establishing module, used for establishing a global map with respect to the navigation space, having each of the plurality of reflective stickers to have at least one first reflective area and at least one second reflective area according to an arrangement coding corresponding to a sticker coordinate of the ach of the plurality of reflective stickers;
   a positioning module, electrically coupled with the map-establishing module, used for providing a position coordinate on the global map;
   a laser scan and analysis module, used for generating a laser beam, scanning the navigation space, receiving a reflective signal in the navigation space, realizing a signal intensity corresponding to the reflective signal; wherein, while in scanning a background region in the navigation space, the signal intensity is defined as a background reflection intensity; wherein, while in scanning one of the plurality of reflective stickers in the navigation space, the signal intensity is defined as a sticker reflection intensity larger than the background reflection intensity; wherein, when the signal intensity is the sticker reflection intensity, a scan direction and distance vector of the each of the plurality of respective reflective stickers with respect to the mobile platform is further captured, and the arrangement coding corresponding to the each of the plurality of reflective stickers is analyzed simultaneously from the reflective signal;
   a coordinate-processing module, electrically coupled with the laser scan and analysis module, used for receiving the arrangement coding and further for transforming the arrangement coding into the sticker coordinate for the each of the plurality of reflective stickers, wherein the sticker coordinate and the position coordinate are used to form a corresponding position direction and distance vector;
   a comparison module, electrically coupled with the coordinate-processing module and the laser scan and analysis module, used for receiving and comparing the scan direction and distance vector and the position direction and distance vector to generate a corresponding calibration signal; and
   a calibration module, electrically coupled with the comparison module and the map-establishing module, used for receiving the calibration signal and further for calibrating the position coordinate on the global map according to the calibration signal.

2. The auxiliary positioning system with reflective stickers of claim 1, wherein the each of the plurality of reflective stickers includes:
   a main layer, having a reflective surface; and
   at least one shading strip, covering a portion of the reflective surface to form a corresponding second reflective area, wherein another portion of the reflective surface uncovered by the at least one shading strip forms at least one first reflective area.

3. The auxiliary positioning system with reflective stickers of claim 1, wherein the each of the plurality of reflective stickers is disposed at a fixed object in the navigation space.

4. The auxiliary positioning system with reflective stickers of claim 1, wherein the positioning module includes:
   a mileage-calculating unit, used for calculating a mileage of the mobile platform;
   a direction-detecting unit, used for detecting a moving direction of the mobile platform; and
   a positioning unit, electrically coupled with the mileage-calculating unit and the direction-detecting unit, using the mileage and the moving direction to calculate the position coordinate.

5. The auxiliary positioning system with reflective stickers of claim 1, wherein the laser scan and analysis module includes:
   a laser-emitting unit, used for emitting the laser beam;
   a receiving unit, used for receiving the reflective signal;
   a judging unit, used for determining whether or not the signal intensity of the reflective signal is the sticker reflection intensity; and
   an analyzing unit, used for capturing the scan direction and distance vector and further for analyzing the reflective signal to realize the arrangement coding upon when the judging unit determines that the signal intensity is the sticker reflection intensity.

6. The auxiliary positioning system with reflective stickers of claim 1, wherein the coordinate-processing module includes a coordinate-calculating unit for calculating a difference between the sticker coordinate and the position coordinate to form the position direction and distance vector.

7. The auxiliary positioning system with reflective stickers of claim 1, wherein the comparison module includes a judging and comparing unit for calculating a difference between the scan direction and distance vector and the position direction and distance vector to generate the calibration signal.

8. The auxiliary positioning system with reflective stickers of claim 1, wherein the sticker reflection intensity is larger than the background reflection intensity at least by five times.

* * * * *